UNITED STATES PATENT OFFICE.

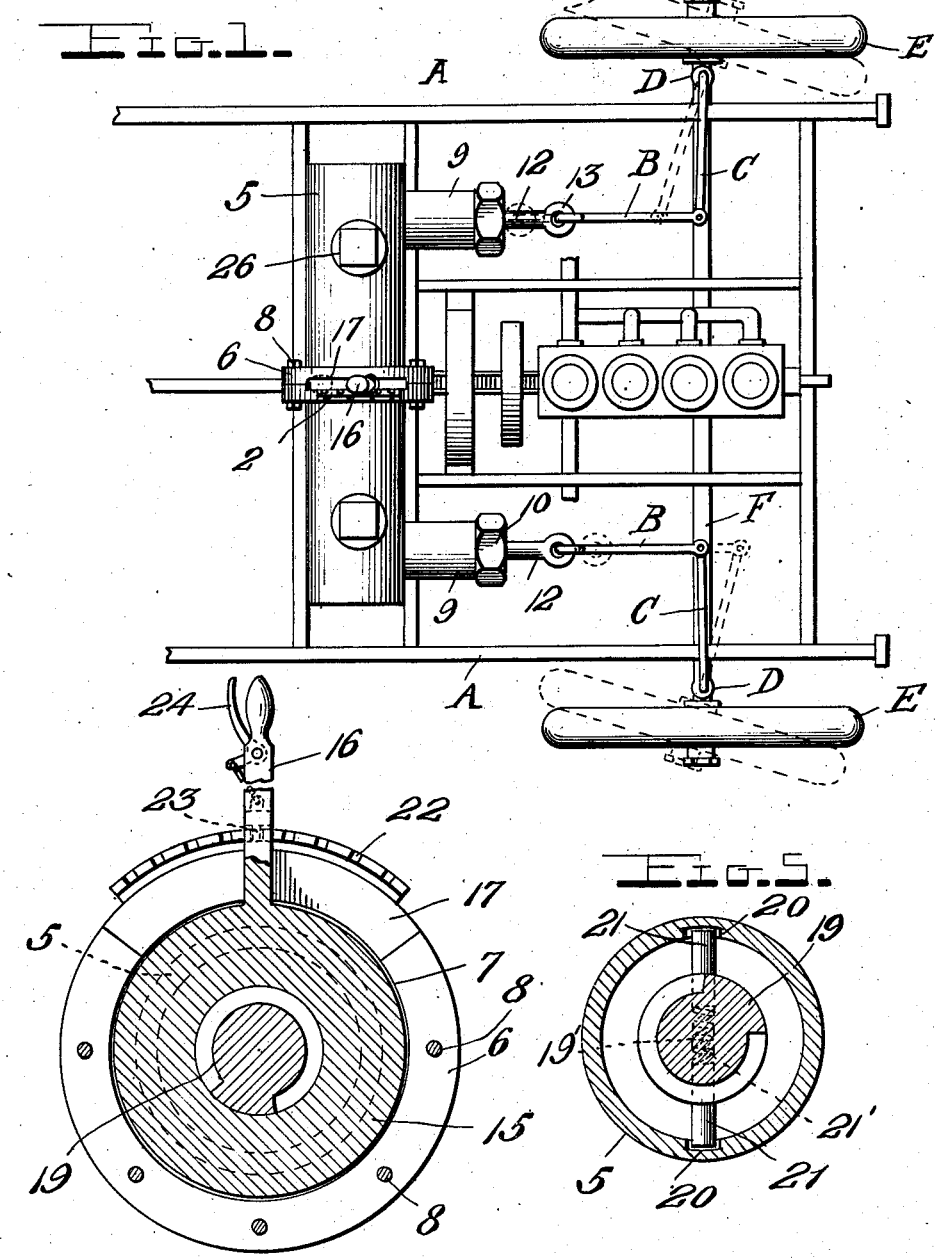

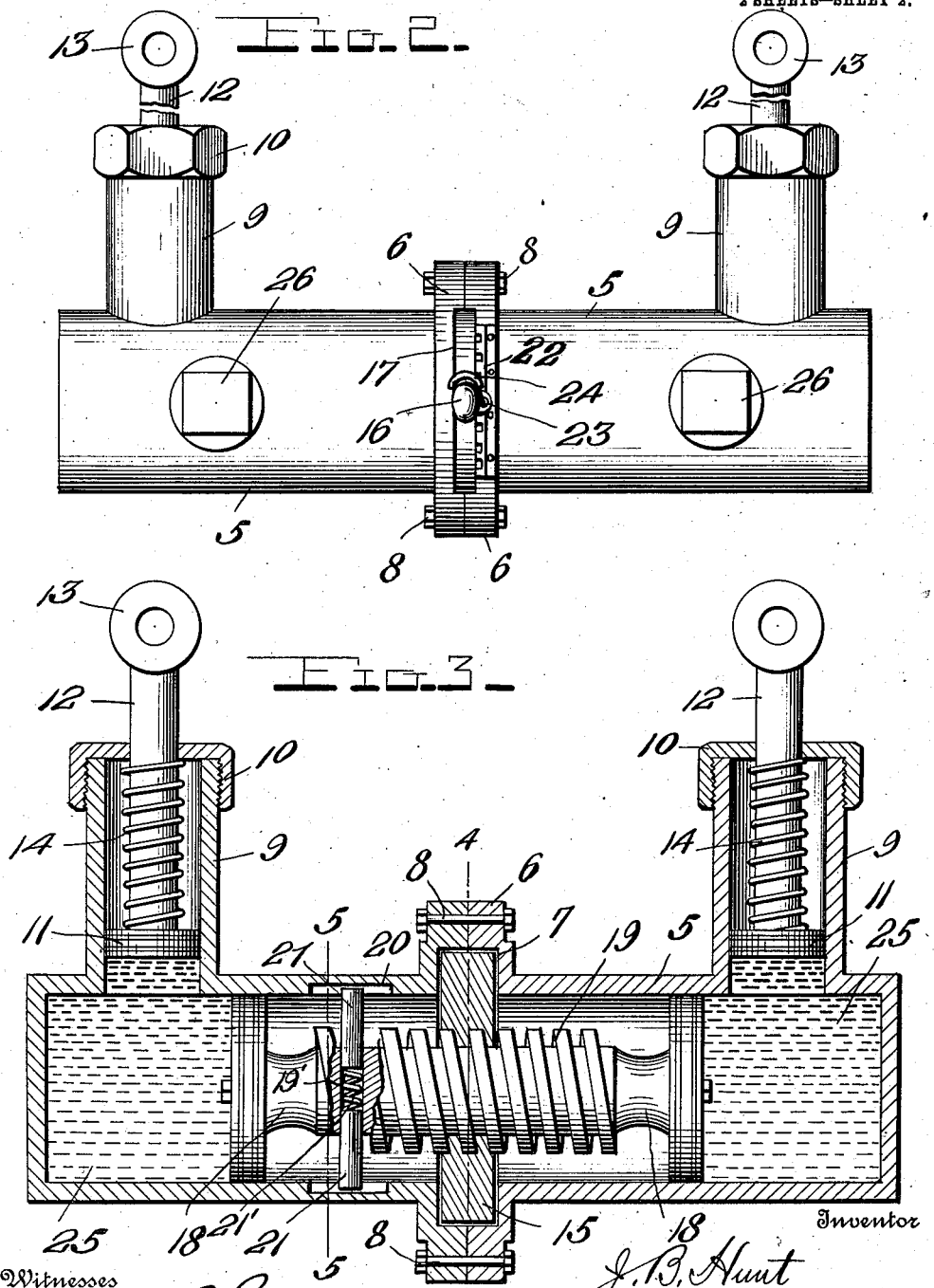

JAMES B. HUNT, OF ROCKWELL, FLORIDA.

STEERING DEVICE.

966,750.  Specification of Letters Patent.  Patented Aug. 9, 1910.

Application filed October 16, 1909. Serial No. 523,004.

*To all whom it may concern:*

Be it known that I, JAMES B. HUNT, a citizen of the United States, residing at Rockwell, in the county of Marion and State of Florida, have invented certain new and useful Improvements in Steering Devices, of which the following is a specification, reference being had to the accompanying drawings.

This invention relates to a fluid pressure device, and in order to illustrate the application thereof I have shown the same as being utilized as a steering mechanism for motor vehicles.

The primary object of the present invention is to provide a device of the above character which is adaptable to a multiplicity of useful purposes, which may be easily and quickly operated and is at all times under the control of the operator.

Another object is to provide a fluid actuated steering device for motor vehicles which when operated will instantly cause the turning of the steering wheels in response to the will of the operator, and may be locked in such position.

A further object is to provide a very simply constructed fluid actuated device which comprises a primary fluid containing chamber, and laterally extending piston chambers communicating therewith, a duplex piston being mounted in said fluid chamber and longitudinally reciprocable therein to discharge the fluid into the piston chambers and alternately reciprocate the pistons therein.

With these and other objects in view, the invention consists of the novel construction, combination and arrangement of parts hereinafter fully described and claimed, and illustrated in the accompanying drawings, in which—

Figure 1 is a top plan view of the device showing the same applied as a steering mechanism for motor vehicles; Fig. 2 is an enlarged top plan view thereof; Fig. 3 is a horizontal section through the device; Fig. 4 is a vertical section taken on the line 4—4 of Fig. 3; and Fig. 5 is a vertical section taken on the line 5—5 of Fig. 3.

The successful operation of automobiles and other motor driven vehicles is largely dependent on the construction of the steering mechanism, which as generally provided is of an extremely complicated nature and is not always positive in its operation, for that reason is directly responsible for a great many accidents.

It is the purpose of my invention to devise a fluid pressure steering mechanism, which is of extremely simple construction, said mechanism being at all times under the control of the operator, whereby the wheels of the vehicle may be readily turned.

To attain the above end I provide a primary fluid cylinder 5 which as shown in Fig. 1 is transversely positioned and supported in the vehicle frame A. I preferably form this cylinder in two sections, the opposed ends of which are formed with the circumscribing flanges 6 to provide one-half of a central housing 7, suitable securing bolts 8 extending transversely through the flanges 6 and securing the two sections of the cylinder together. Integrally formed with the cylinder 5 and laterally extending therefrom are the piston chambers 9, the outer ends of which are threaded to receive a removable closure cap 10. Within each of the chambers 9 a piston 11 is disposed and has reciprocatory movement therein, the piston stem 12 extending through the cap 10 and having an eye 13 formed on its outer end for a purpose which will later appear. A spiral spring 14 is positioned about the piston stem, and normally retains the piston 11 in a position adjacent to the communicating point of the chamber with the cylinder 5.

A circular head 15 is loosely disposed in the housing 7 and is adapted for manual rotation through the medium of the operating handle 16 which extends through a slot 17 formed in the flanges 6. Horizontally positioned in the cylinder 5 there is a duplex piston 18, the heads of which are normally disposed adjacent to the chambers 9. These heads are connected by a screw 19 which is movable through the head 15 as will be later described. One of the sections of the cylinder 5 is formed with the interior opposed longitudinal grooves or recesses 20. The stop pins 21 are radially positioned in one end of the screw 19, and between the inner ends of these pins a coiled spring 21' is arranged within the transverse opening 19' in the screw. The outer ends of these pins are engaged in the groove 20 in the cylinder wall, and when the screw is positioned in the cylinder the pins are forced inwardly against the tension of the spring, which forces said pins radially from the screw as they are moved into the groove. As shown in Fig. 3, when the piston heads are in their normal position, these pins are centrally located in the groove 20. When the operating handle 16 is manipulated to rotate the head 15, the screw 19 will be moved through the head 15 to reciprocate the piston 18 longitudinally in the cylinder, and the engagement of the ends of the pins 21 with the walls of the groove 20 will prevent the rotative movement of the piston. The slot 17 through which the handle 16 extends is adapted to limit the reciprocatory movement of the piston.

Secured upon one of the flanges 6 there is a rack segment 22 which is adapted to receive a spring actuated pin or dog 23 carried by the operating handle 16 and operable through a pivoted grasp 24, which is the ordinary form of rack lever. In this manner the piston heads 18 may be indefinitely held in the position to which they have been moved.

Within the cylinder 5 the oil or other pressure fluid 25 is disposed, and this fluid may be renewed by removing the plugs 26 which close the filling openings in the cylinder wall. As shown in Fig. 3 the actuating fluid is in the ends of the cylinder beyond the piston heads, and is adapted to be discharged into the piston chambers 9 upon the reciprocatory movement of the piston 18, whereupon the pistons 11 will be reciprocated within the chambers and their stems 12 moved through the caps 10 against the tension of the spring 14. It will be noted that as the pressure fluid is forced into one of the chambers 9 through the movement of the piston, the space in the other end of the cylinder is enlarged thereby, and the fluid withdrawn from the other of the chambers 9 so that the spring 14 will force the piston 11 inwardly to its normal position thus an alternate reciprocatory movement is imparted to the piston stems 12, which movement as before stated is limited by the stop pin 21.

As shown in Fig. 1, a link rod B has one of its ends engaged in the eye 13, the other end thereof being pivoted to the inner end of a transverse rod C which is rigidly secured at its outer end to the steering knuckle D. As shown, when the operating handle 16 is moved in the slot 17, the piston stems 12 are longitudinally reciprocated in opposite directions, and position the links B and C as shown in dotted lines to angularly position the vehicle wheels E upon the ends of a stationary shaft F. The degree of angularity is of course entirely dependent upon the extent of movement of the handle 16, and the comparative diametrical proportions of the cylinder 5 and the chambers 9. It will be readily understood that the reciprocatory movement of the piston stems 12 will be increased or decreased according to the amount of actuating fluid which enters the chambers, and this fluid will be expelled into said chambers with a greater or less force in accordance with the rapidity of movement of the piston 18 and the proportional diameters of the cylinder and chambers. It will be obvious that another pair of the chambers 9 could very well be provided upon the opposite side of the cylinder, and operated to independently direct each of the vehicle wheels during the turning movement of the machine.

I have described above the principal and most important use to which the device is adapted and for which it is primarily designed, but it will be understood that it may also be used for the steering of ships or other vehicles and can also be employed for the application of friction on hoisting engines, steam shovels, etc., and as a lifting jack for elevating cars and heavy pieces of machinery, or in any other instance where a high powered lifting jack is necessary.

From the foregoing it will be seen that I have provided a fluid actuated device, which is of very novel construction and when utilized for the steering of motor vehicles, may be instantly actuated to turn the wheels, and lock the wheels in such position if desired.

The device is so located in the machine as to be within easy reach and at all times under the control of the operator. Moreover, its construction is of such simplicity that the liability of the steering mechanism to get out of order and become unmanageable is avoided. It requires no attention whatever beyond the filling of the fluid cylinder, and is in no wise affected by vibration of the vehicle frame, which is the principal reason for the constant disarrangement and consequent inoperativeness of such mechanisms as at present constructed.

Owing to the few elements employed, and the easy manner in which they may be assembled in operative position, the device may be produced at a minimum expenditure and its construction is rendered very durable.

While I have shown and described what I believe to be the preferred form of my invention it will be understood that various modifications may be resorted to in the details of construction without materially affecting the essential features thereof or departing from the spirit of the invention.

A device constructed as above described may also be utilized for driving what is known as lever railway cars which are adapted to be driven by hand through the medium of cranks which are rotated by a manually operated lever.

Having thus described the invention, what is claimed is:

1. In a fluid actuated device of the character described, a fluid cylinder, a plurality of piston chambers communicating with said cylinder, a spring pressed reciprocating piston in each of said chambers, a duplex piston mounted in said cylinder, a body of fluid being disposed between each of the heads of the duplex piston and the pistons in said chambers, manually operable means for reciprocating said duplex piston to alternately force the fluid into the chambers and reciprocate said pistons, the springs in said chambers being placed under compression.

2. In a fluid actuated device of the character described, a fluid cylinder consisting of two sections, the opposed ends of each section having a circumscribing flange, fastening bolts disposed through said flanges, a laterally extending cylindrical chamber integrally formed with the cylinder and communicating therewith at the other end of each of said sections, a reciprocating piston disposed in each of said chambers, means for normally holding said pistons against reciprocatory movement, a duplex piston disposed in said cylinder, one of the piston heads being located in each of the sections, means for reciprocating said piston in either direction, such reciprocation being adapted to force the liquid in the cylinder into one of said chambers to force said piston outwardly against the holding means, said piston holding means forcing the other of the pistons inwardly and discharging the liquid from the chamber, and means for limiting the reciprocatory movement of the duplex piston, substantially as and for the purpose set forth.

3. In a fluid actuated device of the character described, a cylinder adapted to contain actuating fluid, said cylinder consisting of two sections, the opposed ends of each of said sections being flanged and connected together, said flanges forming a housing, a rotatable head mounted in said housing, a duplex piston disposed in said cylinder adapted to be reciprocated therein by the rotative movement of said head, a laterally extending chamber integrally formed at the opposite ends of the cylinder, a reciprocating piston mounted in each of said chambers, the reciprocatory movement of the duplex piston being adapted to move the actuating fluid to alternately reciprocate said pistons, and means for limiting the reciprocatory movement of said duplex piston, substantially as and for the purpose set forth.

4. In a fluid actuated device of the character described, a sectional cylinder adapted to contain an actuating fluid, one end of each of the sections having a laterally extending chamber integrally formed and communicating therewith, suitable securing means being adapted to connect the other ends of said sections, said cylinder sections having a housing formed in their connected ends, a head rotatably mounted in said housing, means for rotating said head, a duplex piston disposed in said cylinder, the rotative movement of said head being adapted to reciprocate said piston, a reciprocating piston mounted in each of said chambers, a spring normally acting to force the piston inwardly, the reciprocation of said duplex piston moving the actuating fluid in the cylinder to alternately reciprocate the pistons in said chambers, and means for limiting the reciprocatory movement of said duplex piston, substantially as and for the purpose set forth.

5. In a fluid actuated device of the character described, a cylinder having a central housing formed therein, a laterally extending chamber integrally formed with said cylinder at its opposite ends, a reciprocating piston in each of said chambers, a duplex piston mounted in said cylinder, means rotatably mounted in said housing adapted to reciprocate said piston, an actuating fluid in said cylinder between the piston in said chambers and the heads of said duplex piston, the reciprocatory movement of said last named piston being adapted to force the fluid into said chambers and alternately reciprocate the pistons therein, and means for limiting the movement of said duplex piston, substantially as and for the purpose set forth.

6. In a fluid actuated device of the character described, a fluid containing cylinder having a housing centrally formed therein, a rotatable head disposed in said housing, a duplex piston disposed in said cylinder, said piston being engaged with and movable through said head upon the rotation thereof to reciprocate the piston, a cylindrical chamber extending laterally from the opposite ends of said cylinder, a fluid actuated reciprocatory piston disposed in each of said chambers, the actuating fluid being contained between said pistons and the heads of the duplex piston, the reciprocatory movement of said last named piston being adapted to alternately force the actuating fluid into each of said chambers and reciprocate the pistons therein, and means carried by said duplex piston to prevent rotative movement thereof, substantially as and for the purpose set forth.

7. In a fluid actuated device of the character described, a fluid cylinder having a central annular housing, a cylindrical chamber extending laterally from each end of said cylinder, a removable closure for the outer ends of said chambers, a reciprocating piston disposed in each of said chambers, a spring disposed about each of the piston stems between the heads thereof and the closures, a rotatable head mounted in said housing, said head having an operating handle connected thereto, said handle extending through a slot formed in the housing, a duplex piston mounted in said cylinder, the piston heads being connected by a screw, said screw engaged in and movable through the rotatable head to reciprocate said piston, said head being movable in reverse directions, said cylinder having an interior groove at one side of said housing, a stop pin carried by the screw and disposed in said groove, said pin being adapted to prevent rotative movement of said piston, the actuating fluid being disposed between the pistons in said chambers and the heads of said duplex piston, said fluid being alternately forced into each of said chambers to reciprocate the piston therein upon the rotation of the operating head, substantially as and for the purpose set forth.

8. In a fluid actuated device of the character described, a fluid cylinder having a housing centrally formed therein, a laterally extending chamber integrally formed with said cylinder at its opposite ends, a spring controlled fluid actuated reciprocatory piston disposed in each of said chambers, a rotatable operating head disposed in said housing, an operating handle integrally formed with said head, said handle extending through a slot formed in the housing, spaced piston heads disposed in said cylinder, a screw connecting said heads for simultaneous reciprocatory movement, said screw being engaged in and movable through the operating head upon the rotation thereof, the reciprocation of said heads being adapted to force the actuating fluid into said chambers and alternately reciprocate the piston therein, a spring pressed stop pin carried by said screw, the ends of said pin being disposed in a longitudinal groove in the cylinder wall and adapted to prevent rotative movement of said piston heads, and means for holding said operating head against reverse rotation, substantially as and for the purpose set forth.

9. In a fluid actuated device of the character described, a cylinder having a housing centrally formed therein, a laterally extending chamber integrally formed with said cylinder and communicating therewith, a spring controlled reciprocating piston disposed in each of said chambers, a rotatable operating head mounted in said housing, an operating handle carried by said head and extending through a slot in the housing, means for holding said operating head against rotation, a piston head disposed in said cylinder upon opposite sides of the housing, a screw integrally formed with said heads and connecting the same, said screw being engaged in and movable through the operating head upon the rotation thereof to reciprocate said pistons, a spring pressed stop pin carried by said screw adapted to prevent rotation thereof, and an actuating fluid in the opposite ends of said cylinder between the piston heads and the pistons in said chambers, said fluid being forced into said chambers to alternately reciprocate the pistons therein, upon the reciprocation of the pistons in said cylinder, substantially as and for the purpose set forth.

10. In a fluid actuated device of the character described, a cylinder having a laterally extending chamber at its opposite ends, a fluid actuated reciprocatory element in each of said chambers, a reciprocating piston in said cylinder, the actuating fluid being disposed between the ends of said piston and said element, means for causing the reciprocatory movement of said piston, and radially extending spring pressed stops carried by said piston and adapted to engage with the walls of a groove interiorly formed in said cylinder to prevent the rotation of said piston.

11. In a fluid actuated device of the character described, a cylinder having a central housing formed therein, a laterally extending chamber integrally formed on the opposite ends of said cylinder, a fluid actuated spring controlled reciprocating piston in each of said chambers, a duplex piston in said cylinder, the heads of said piston being disposed on opposite sides of said housing, a screw connecting said piston heads, manually operated means disposed in said housing and engaged with said screw to reciprocate said piston, the actuating fluid being disposed between the pistons in said chambers and the heads of said duplex piston, the reciprocatory movement of said piston being adapted to alternately force the fluid into said chambers and reciprocate the pistons therein, a segmental rack mounted on the housing adapted to receive a spring pressed dog carried by the operating means to hold said duplex piston at any point of its reciprocatory movement, said screw having a transverse opening through one end thereof, stop pins movable in said opening and extending from said screw at diametrically opposite points, a coiled spring disposed in said opening between the inner ends of said pins, said spring being adapted to force the pins outwardly to dispose their outer ends in opposed longitudinal grooves in the cylinder wall, said pins being adapted to limit the reciprocatory movement of said duplex piston, substantially as and for the purpose set forth.

12. In a fluid actuated device of the character described, a fluid cylinder, a piston chamber communicating with each end of said cylinder, a spring pressed piston in each of said chambers, a reciprocating duplex piston mounted in the cylinder, a movable body between each of the heads of the duplex piston and the pistons in said chambers, and manually operated means engaging with said piston to reciprocate the same and alternately force the movable body into the end chambers to reciprocate the pistons therein, substantially as and for the purpose set forth.

13. In a fluid actuated device of the character described, a fluid cylinder, a laterally extending piston chamber formed on each end of said cylinder and communicating therewith, a reciprocating piston in each of said chambers, a movable body between each of the heads of the duplex piston and the pistons of the chambers, a manually operable rotatable head engaging with the duplex piston to reciprocate the same and force the movable bodies alternately into said piston chambers to reciprocate the pistons therein, means for returning the said pistons to their normal positions, and means for limiting the reciprocating movement of the duplex piston.

In testimony whereof I hereunto affix my signature in the presence of two witnesses.

JAMES B. HUNT.

Witnesses:
WM. M. GOBER,
A. B. KILELER.